United States Patent
Gonzaga et al.

(10) Patent No.: US 10,189,322 B2
(45) Date of Patent: Jan. 29, 2019

(54) DEVICE FOR DISASSEMBLING A TIRE FROM A WHEEL RIM AND A METHOD OF DISASSEMBLING A TIRED WHEEL

(71) Applicant: BUTLER ENGINEERING AND MARKETING S.P.A., Rolo, Reggio Emilia (IT)

(72) Inventors: Tullio Gonzaga, Correggio (IT); Silvano Santi, Imola (IT)

(73) Assignee: BUTLER ENGINEERING AND MARKETING S.P.A., Rolo, Reggio Emilia (IT)

( * ) Notice: Subject to any disclaimer, the term of this patent is extended or adjusted under 35 U.S.C. 154(b) by 712 days.

(21) Appl. No.: 13/954,510

(22) Filed: Jul. 30, 2013

(65) Prior Publication Data

US 2014/0034248 A1 Feb. 6, 2014

(30) Foreign Application Priority Data

Aug. 1, 2012 (IT) ............... VR2012A0159

(51) Int. Cl.
*B60C 25/135* (2006.01)
*B60C 25/05* (2006.01)

(52) U.S. Cl.
CPC ...... *B60C 25/0524* (2013.01); *B60C 25/0506* (2013.01); *B60C 25/0563* (2013.01); *B60C 25/0578* (2013.01); *B60C 25/0593* (2013.01)

(58) Field of Classification Search
CPC . B60C 25/132; B60C 25/138; B60C 25/0578; B60C 25/0503; B60C 25/0506; B60C 25/0524; B60C 25/0593
USPC ...................................... 157/1.17, 1.24, 1.3
See application file for complete search history.

(56) References Cited

U.S. PATENT DOCUMENTS

| 6,619,362 B2 * | 9/2003 | Corghi | 157/1.24 |
| 6,880,605 B2 * | 4/2005 | Corghi | 157/1.24 |
| 7,128,119 B2 * | 10/2006 | Corghi | 157/1.22 |
| 7,497,761 B2 * | 3/2009 | Gonzaga | 157/1.17 |

FOREIGN PATENT DOCUMENTS

| EP | 1 177 920 | 2/2002 | |
| EP | 1 398 184 | 3/2004 | |
| EP | 1 714 807 | 10/2006 | |
| EP | 2 463 125 | 6/2012 | |
| EP | 2463125 B1 * | 7/2013 | ........... B60C 25/138 |
| WO | WO 2009/130135 | 10/2009 | |
| WO | WO 2009/138322 | 11/2009 | |
| WO | WO 2009138322 A1 * | 11/2009 | ........... B60C 25/138 |

OTHER PUBLICATIONS

Italian Search Report dated Jan. 28, 2013 issued in corresponding Italian patent application VR2012A000159.

* cited by examiner

*Primary Examiner* — Hadi Shakeri
(74) *Attorney, Agent, or Firm* — Tutunjian & Bitetto, P.C.

(57) ABSTRACT

The present invention relates to a device for dismounting a tired wheel having a wheel rim and a tire mounted on the wheel rim, including:
  a support member,
  a bill or lever-shaped dismounting tool having one end thereof articulated to the support member, and the other work end thereof substantially hook-shaped, and
  holding means for holding the tool in an engagement and extraction position, the holding means including an elastically loaded pin.

15 Claims, 6 Drawing Sheets

DEVICE FOR DISASSEMBLING A TIRE FROM A WHEEL RIM AND A METHOD OF DISASSEMBLING A TIRED WHEEL

FIELD OF INVENTION

The present invention relates to a tire disassembling device, and a method of disassembling a tired wheel, more particularly a wheel of relatively large dimensions, e. g. a lorry or truck wheel.

BACKGROUND OF INVENTION

Many machines for assembling and disassembling tired wheels have been proposed up to now. Thus, for example, the European patent application EP-1 177 920 teaches a machine for assembling and disassembling a tire onto and from a wheel rim, that comprises a base on which a wheel bearing table is mounted for rotation and from which a column extends upwards at the rear side of the base.

Parallel straight guides are provided on the column that are substantially vertical, in use, and on which a device for assembling and disassembling a tire onto and from a wheel rim is slidably mounted. Such a device comprises a carriage that is slidably mounted along the guides and bears a sleeve having a substantially horizontal axis which supports one end of a hollow shaft that overhangingly extends from the sleeve. The hollow shaft at its end secured to the sleeve abuts against one end of the cylinder of a cylinder-and-piston jack, whereas at its other end or distal end it supports a hollow head having an inner opening larger in size than that of the hollow shaft.

The piston rod of the jack extends throughout the entire or almost the entire length of the hollow shaft, and by means of a leverage it controls a disassembling tool supported by the hollow head and protruding therefrom. More particularly, the disassembling tool is pivoted in order to be angularly displaceable about an articulation axis at right angles with the axis of the hollow shaft.

By controlling the forward/back movements of the jack piston rod, one controls the angular movements of the disassembling tool at the front of the hollow shaft.

At the diametrically opposite position with respect to the disassembling tool, an auxiliary assembling tool is secured to the hollow head.

In order to disassemble a tire from its wheel rim once the latter has been blocked on the wheel rim bearing table, one proceeds first to bead break the tire, as is common practice in the art, by using a suitable bead breaking tool, then the carriage is caused to slide along the guides to bring the tool tip immediately above the tire bead close to the edge of the wheel rim. At this point, a further movement of the carriage occurs along the guides to cause the hollow shaft to approach to the wheel rim, and then upon energizing the jack the disassembling tool is arranged in a tire bead "grasping" position, in which the tool tip is directed according to the axis of rotation of the wheel bearing table. The hollow shaft then continues or is forced to lower so as to cause the tool to enter between tire and wheel rim until the hook tip of the tool has engaged, i. e. grasped, from the inside the bead of the tire. At that point, the operator controls a backward movement of the jack piston rod, so as to tilt, while being angularly displaced, the tool up to bring it in a position indicated as "extraction" position of the bead.

Such a machine is rather complex to manufacture and also requires the execution of tool control operations in any operating steps. The device is defined as being automatic, although as a matter of fact it is permanently controlled by the operator.

The European patent application EP-1 398 184 also discloses a device similar to that described above, which is controlled and guided throughout all the disassembling steps through controls given by suitable actuators.

The European patent application EP-1 714 807 in the name of the applicant of the present patent application discloses a tire assembling-disassembling machine comprising a base, a wheel bearing table supported by the base, by a column rising from the base and a tool bearing arm that overhangingly extends from the column on which it is slidably mounted. The tool bearing arm extends in a radial direction with respect to a wheel rim mounted on the wheel bearing table, and can be caused to move in a direction substantially parallel to the axis of rotation of the wheel rim on the wheel bearing table.

At its overhanging end, the tool bearing arm supports, either directly or through a link element, a bill element that constitutes the actual tool.

Between bill element and tool bearing arm, elastic loading means (e. g. a spring) can be provided which are designed to keep the bill element in a substantially vertical trim.

In order to dismount a tire by means of such a bill tool, a tired wheel is arranged and blocked on the wheel bearing table of the machine. One proceeds to bead breaking the tire and then, by suitably lowering the tool bearing arm, the bill tip is brought to abut against the wheel rim edge close to the tire bead. The tool bearing arm is then further lowered, thereby forcing the bill tip to enter between tire bead and edge of the wheel rim until the bead is engaged from the inside at an inner recess of the bill.

The bill is then progressively raised in a substantially vertical trim and is forced to angularly move backwards, thereby automatically taking an inclined trim with respect to a vertical line. The bill brings with it the hooked bead to move it outside the edge of the wheel rim. At that point, it will be sufficient to cause the wheel rim or the tool to rotate in order to move the entire tire bead beyond the edge of the wheel rim.

Such a solution is surely simpler than the two previous ones, and is quite satisfactory for cars, whereas it is not always suitable for large size wheels, such as lorry wheels.

WO-2009-13 83 22, WO-2009 13 01 35, EP-2 463 125 disclose respective prior art tools for disassembling a tire from a wheel rim.

SUMMARY OF THE INVENTION

The main object of the present invention is to provide a tire dismounting device suitable for allowing an efficient and rapid dismounting of a tired wheel even if of large size.

Another object of the present invention is to provide a tire dismounting device that is structurally simple, handy to use, and inexpensive to produce.

Another object of the present invention is to provide a new method of dismounting a tired wheel, which is easy and rapid to carry out.

According to a first aspect of the present invention there is provided a device for dismounting a tired wheel having a wheel rim and a tire mounted on the wheel rim, comprising:
 a support member,
 a bill or lever-shaped dismounting tool having one end thereof articulated to the support member, and the other work end thereof substantially hook-shaped, whereby the dismounting tool can be angularly displaced between a first insertion position between the bead and wheel rim edge, and a second tire bead engagement and extraction position, the device comprising holding means for holding the tool in engagement and extraction position having an interception element carried either by the support member or the disassembling tool and arranged to intercept the tool or the support member, respectively, when the disassembling tool reaches the engagement and extraction position, the holding means comprising an elastically loaded pin 7.

Advantageously, the device comprises returning means or articulation or pivoting means between the articulation end and the support member, designed to allow the disassembling tool to be controllably angularly displaced with respect to the support member between the insertion position and the engagement and extraction position due to the reaction force of a wheel rim and/or the tire onto the work end.

More advantageously, when said tool is in the first insertion position, the holding means are in a retracted position in which they do not hinder the tool articulation, whereas when the tool is moved into the second extraction position the holding means are triggered into a position in which they block any further articulation movement of the tool with respect to the support member.

According to another aspect of the present invention there is provided a method of disassembling a tire bead from its respective wheel rim edge, comprising the following steps in sequence:

arranging a disassembling bill tool in an insertion position in which the work end thereof is abutting against the tire bead of a tired wheel to be disassembled, causing a relative movement between the disassembling tool and the wheel rim in a direction parallel to the axis of rotation of the tired wheel or of the wheel rim, thereby forcing the work end of the tool to enter between the tire and the wheel rim and to go beyond the tire bead, causing a relative movement along an orthogonal direction to the axis of rotation between wheel rim and tool, thereby causing an angular movement of the tool between a first insertion position and a second extraction position, where the work end is facing in the direction moving away from the axis of rotation and is in forced grasping with the tire bead that is thus radially widened, thereby energizing holding means to lock the tool in position, moving backwards the disassembling tool and/or the wheel rim parallel to the axis of rotation, and causing the wheel or the tool to rotate, thereby bringing the whole tire bead beyond the edge of the wheel rim.

Advantageously, during the relative movement the tool is moved from the insertion position to the extraction position owing to the reaction force of the wheel rim.

BRIEF DESCRIPTION OF THE DRAWINGS

Further aspects and advantages of the present invention will better appear from the following detailed description of specific embodiments of a disassembling tool, the description being made with reference to the accompanying drawings, in which.

In the accompanying drawings, similar or the like parts or component are indicated with the same reference numerals.

DETAILED DESCRIPTION OF THE PREFERRED EMBODIMENTS

With reference first to FIGS. 1 to 9, there is illustrated a disassembling device 1 for disassembling a tire from a tired wheel, particularly suitable for relatively large size, e. g. lorry wheels, which comprises a support arm or member 2, e. g. a straight arm with a longitudinal axis x-x, having a head end 2a and a connection end, preferably for being removably connected to a support or guide member (see FIGS. 10 to 15). The support arm 2 preferably bears on its head a fork member, e. g. comprising a pair of parallel opposite plates 3 spaced apart from one another, between which one articulation or proximal end 4a of a bill or lever-shaped disassembling tool 4 is articulated about an axis y-y orthogonal to the longitudinal axis x-x of the arm 2. The other end or work or distal end 4b of the tool 4 is substantially hook-shaped or the like and is located outside the pair of plates 3.

The disassembling tool is angularly movable, as further explained below, between a first insertion position between bead T1 of the tire T and the respective edge W1 of the wheel rim W, and a second engagement and extraction position of the bead T1 of the tire T.

If desired, the tool 4 can be directly articulated to the arm 2.

Figures 1, 2, 3:
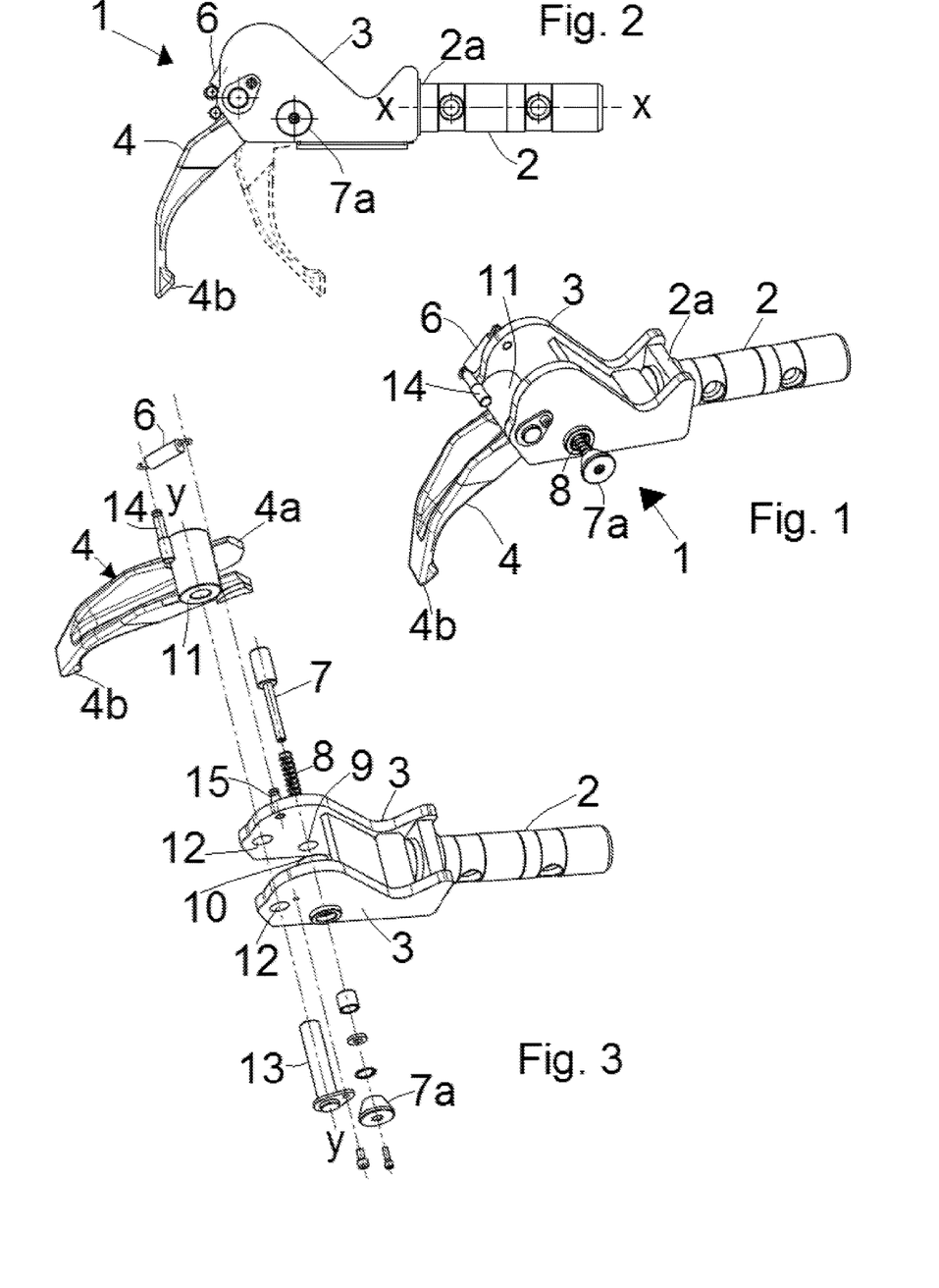
FIG. 1 is a perspective view of a disassembling tool according to the present invention.
FIG. 2 is a side view of the device of FIG. 1 in two operative positions.
FIG. 3 is an exploded view of the device of FIG. 1.

The tool 4 can be substantially shaped as a curved bill or lever. In order to make it sturdier, the tool 4 is advantageously U-shaped in cross-section starting from its articulation or proximal end 4a to an area close to its work or distal end 4b (FIG. 3). For pivoting the tool 4 to the support arm 2, a bush element 11 can, for example, be provided which extends transversally and is rigidly connected, e. g. welded, to the tool 4, e. g. at its proximal end 4a. With such a configuration, the bush element 11 delimits a throughout axial light that is brought in alignment with two through opposite holes 12 each formed in a respective plate 3. An articulation pin 13 is insertable and lockable in position in any suitable way into the holes 12 and the bush 11.

Advantageously, the axis of the pin 13 coincides, in use, with the axis y-y substantially orthogonal to the longitudinal axis x-x of the arm 2.

Articulation or pivoting means or returning means can also be provided between the articulation end 4a of the bill 4 and the support arm 2, which are designed to cause the disassembling tool 4 to return in position. The tool 4 is movable, in use, between an insertion position (FIGS. 4 and 7) and an extraction position (FIGS. 5, 6, 8 and 9), as further described hereinbelow. The returning means preferably comprise a spring or another elastic loading component 6.

The articulation or pivoting means are designed to allow the disassembling tool 4 to be angularly moved with respect to the support arm or member 2 between the insertion position and the engagement and extraction position owing to the reaction force of the wheel rim W and/or the tire T onto the work end 4b during disassembling operations.

The disassembling device 1 also comprises locking means or holding means for holding the tool 4 in engaging and extraction position, such means being designed to enter into action once the tool 4 has reached an extraction position. Preferably, the holding means comprise an interception element, preferably a pin 7 that can be inserted into the arm or the plates 3 and is advantageously elastically loaded, e. g. by a spring 8. The pin 7 is designed to act as an interception element for the tool 4, as further illustrated hereinbelow.

As it will be understood, the interception element 7 can be carried either by the support member 2 or by the disassembling tool 4, and is designed to intercept the tool 4 or the support member 2, respectively, when the disassembling tool 4 reaches its engagement and extraction position.

More particularly, the tool 4 can be angularly moved between an insertion position or starting work position, in which the tool is oriented according to a given angle with respect to the longitudinal axis x-x of the support arm 2, e. g. about 120° (FIGS. 4 and 7), whereas the locking or interception element 7 is in a retracted position (as further explained hereinbelow), in which position it does not hinder the tool articulation or better the angular movement of the proximal end 4a thereof, and an extraction position in which the disassembling tool 4 (in contrast with the action of the spring 8, if provided) is angularly moved to form, e. g. an angle of 90° (FIGS. 5 and 8) with respect to the longitudinal axis x-x. In the extraction position, the locking means are set free or are released to reach a position in which they prevent any further articulation movement of the tool 4 with respect to the arm 2.

Figure 8:
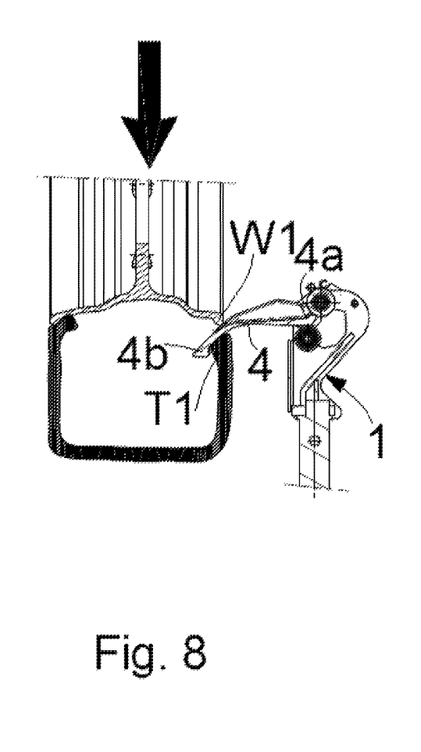
Figure 9:
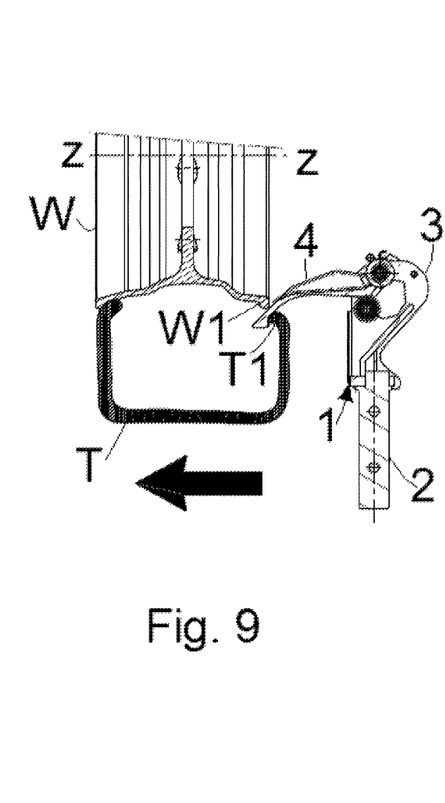

In its initial work position, the proximal end 4a of the tool moves flush with and covers the receiving seat of the pin 7, and thus the pin 7 is held in a retracted position in contrast with the spring 8 (FIG. 8). When the tool 4 reaches the extraction position, the proximal end 4a sets free or uncovers the receiving zone of the pin or lock 7, whereby the pin 7 urged by the spring 8 enters the space between the plates 3 and reaches a position to act as abutting member for the end 4a (FIGS. 5, 6,8 and 9).

If desired, in the starting work position the work end 4b of the disassembling tool 4 has, in use, a trim substantially parallel to the axis of rotation z-z of the wheel to be disassembled or the wheel rim thereof, or is directed towards the axis of rotation z-z.

Figure 4:
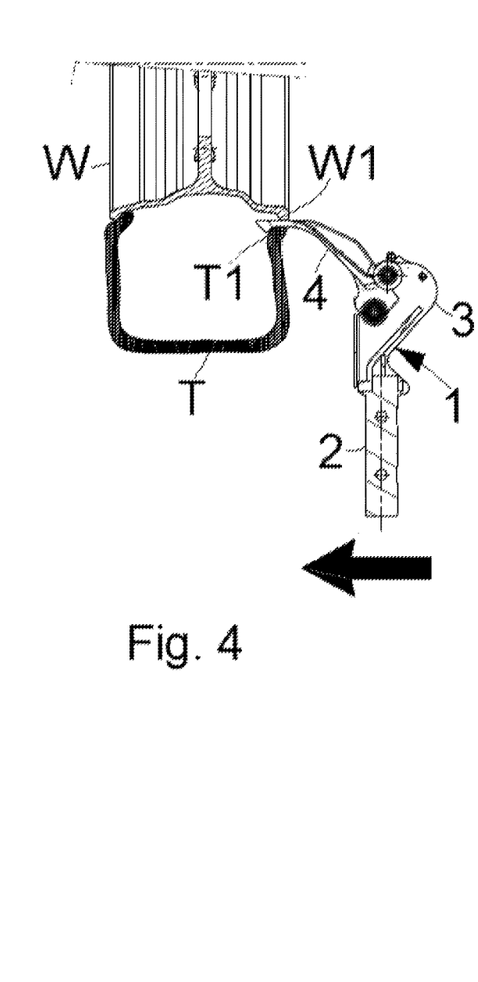
FIGS. 4 to 6 are side view with parts in cross-section that illustrate respective steps of a disassembling operation of a tire by means of a disassembling device of FIGS. 1 to 3.
Figure 5:
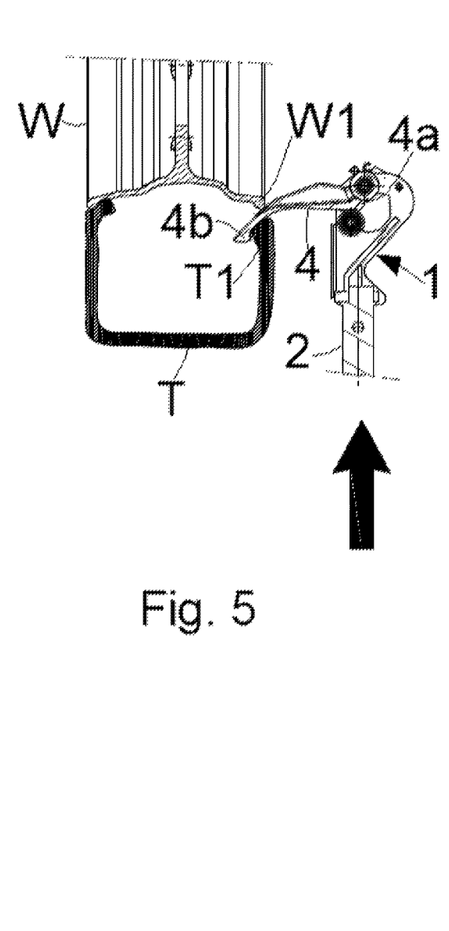
Figure 6:
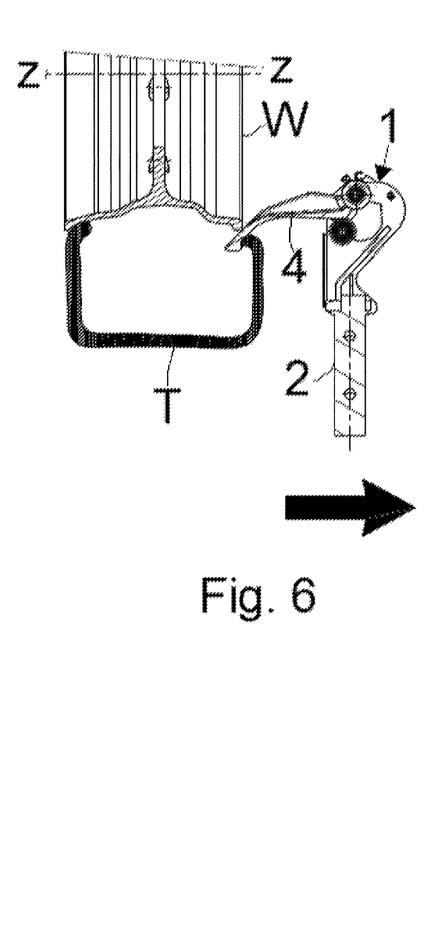
Figure 7:
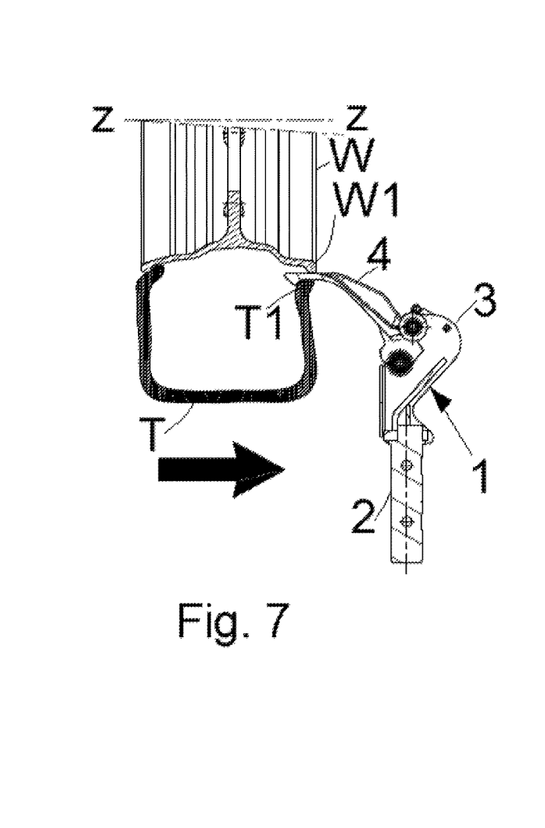
FIGS. 7 to 9 are side view with parts in cross-section that illustrate respective steps of another disassembling operation by means of the disassembling device of FIGS. 1 to 3.

Preferably, the lock or pin 7, when the disassembling tool 4 is in the starting work position, is urged by its spring 8 to slidingly press against the lateral surface of the proximal end 4a of the tool 4, while it is seated in a sleeve 10 overhangingly extending from a plate 3 in the zone between the plates 3. When, instead, the disassembling tool 4 is brought in the extraction position, the lock 7 under the action of the spring 8 extends out of the sleeve 10 to reach the other plate 3, in which a hole 9 can be provided in alignment with the light of the sleeve 10. The lock can be partly inserted into the hole 9, when the tool is brought in its extraction position. The sleeve 10, if desired, can also act as a limit switch for the tool in the insertion position (FIGS. 4 and 7).

Since when the pin 7 is released, it opposes and prevents backward movements of the tool (i. e. from the extraction position to the starting work position).

In order to bring the tool 4 to the starting work position, it is required to return the pin 7 to its initial position, e. g. by manually or automatically pulling it backwards in any suitable manner. To this end, a knob 7a can be provided which is connected to the pin and can be held from outside the plate 3 bearing the sleeve 10.

The return spring 6 is instead advantageously connected, at one end thereof, to a pawl 14 raising from the side wall of the bush 11 and, at the other end, to a pawl 15 secured to one of the plates 3 (that one in which the hole 9 is formed) and externally extending to the zone delimited between the two plates.

Advantageously, the pawl 14 is designed to contrast angular movements of the disassembling tool 4 in (clockwise, when seeing the drawings) direction opposite to that from the starting work position to the extraction position, since, should the tool 4 be pushed in that direction, the pawl 14 would bump against the edge of one of the plates 3.

In order to disassemble a tire T from a wheel rim W of a vehicle wheel, e. g. a lorry wheel, by means of the disassembling tool 1, after a bead T1 has been bead broken, as it is known, from its respective edge W1 of the wheel rim W, the tool 4 is brought to the starting insertion or work position, i. e. with its work end 4b abutting against the bead T1 of the tire T ready to enter between tire bead T1 and edge W1 of the wheel rim W. The arm 2 is then moved parallel to the axis of rotation z-z of the wheel (wheel rim W plus tire T), thereby forcing the work end 4b of the tool 4 to enter between tire and wheel rim (FIG. 4 or 7). Once the hook end 4b of the tool 4 has moved beyond the bead T1 of the tire T, a relative movement (typically in a direction parallel to the longitudinal axis x-x of the support arm 2) is caused between wheel and device 1, whereby controlling the angular movement of the tool 4 with respect to the wheel between insertion position and extraction position, in which the tool 4 is positively gripping a portion of the tire bead in order to widen it radially, thereby energizing the holding means (elastically loaded pin 7) to lock in position the tool 4, and thereby preventing any backward movement of the tool 4 with respect to the arm 2 (FIGS. 5, 6, 8 and 9).

As it will be understood, the relative movement between wheel and disassembling tool 1 can be carried out by moving the support arm 2 in an approaching direction to the axis of rotation z-z of the wheel rim (FIGS. 4 to 6), by moving the wheel or the wheel rim W in an approaching direction to the support arm 2 (FIGS. 7 to 9), or by a combination of such movements.

At this point, the support arm is moved backwards parallel to the axis of the wheel and the wheel or the tool 4 is set in rotation, thereby bringing the whole bead T1 of the tire T to move beyond its respective edge W1 of the wheel rim W, thus bringing the disassembling operation to an end. Alternatively, instead of moving the arm 4, the wheel rim W or the tired wheel can be moved parallel to the axis of rotation z-z.

In a method according to the present invention, the tool is advantageously always in contact with the wheel rim W and/or the tire T, as they (the wheel rim W and/or the tire T) cause, owing to respective reaction forces, the tool to angularly move during the disassembling steps.

The device 1 does not comprise any actuator designed to control the tool 4, but only articulation means and locking means. The tool 4 is thus moved between starting work position and extraction position due to the action or reaction force of the wheel rim W and/or the tire T.

A disassembling method is described with reference to the device according to the present invention, however, it will be understood that in general a disassembling method of a tire bead from its respective edge of a wheel rim according to the present invention, comprises the following steps in sequence:

bringing a bill-shaped disassembling tool 4 in an insertion position, in which its work end 4b is abutting against the tire bead T1 of the tired wheel to be disassembled and advantageously oriented substantially parallel to the axis of rotation z-z of the tired wheel or of the respective wheel rim W, or directed towards the axis of rotation z-z, causing a relative movement between the disassembling tool 4 and the wheel rim W in a direction parallel to the axis of rotation z-z, thereby forcing the work end 4b of the tool 4 to enter between tire T and wheel rim W and to go beyond the tire bead T1, causing a relative movement along a direction orthogonal to the axis of rotation z-z between wheel rim W and tool 4, whereby causing an angular movement of the tool 4 between the first insertion position and a second extraction position, in which the work end 4b is arranged in the sense of moving away from the axis of rotation z-z and force engaged with the tire bead T1 which is thus radially widened, thereby energizing holding means to lock in position the tool 4, moving backwards the disassembling tool 4 and/or the wheel rim W parallely to the axis of rotation z-z, and setting in rotation the wheel or the tool thereby bringing the whole tire bead T1 beyond the edge W1 of the wheel rim W.

Preferably, such method is carried out by means of the device according to the present invention, as well as with a machine according to the present invention.

Figure 10:
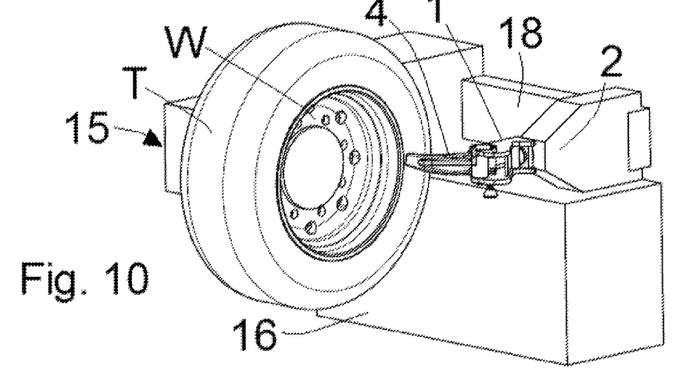
FIGS. 10, 11 and 12 are perspective slightly from above, front and side views, respectively, of a disassembling machine according to the present invention.
Figure 11:
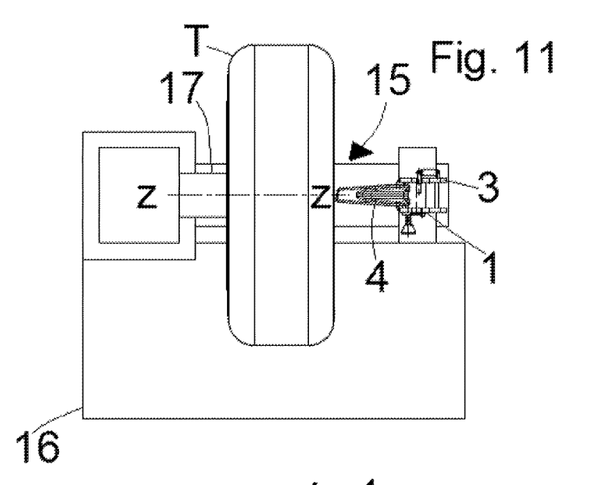
Figure 12:
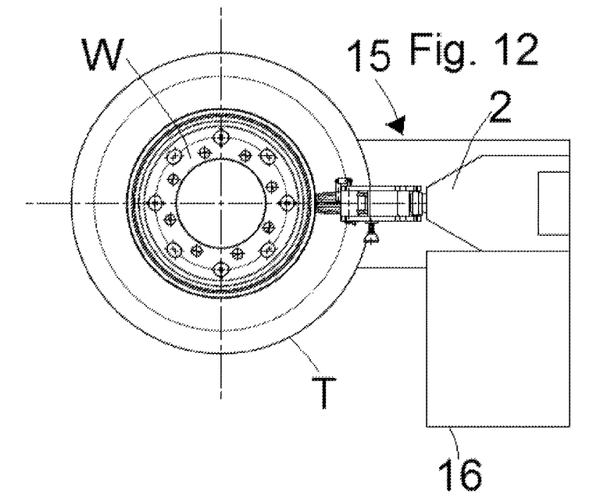

With reference to the embodiment illustrated in FIGS. 10 to 12, there is illustrated a tire assembling-disassembling machine 15 comprising a base 16, support means and rotational drive means 17 for a tired wheel mounted for rotation about a horizontal, in use, axis z-z on said support means, as well as a substantially horizontal guide member 18, on which the support member or arm 2 of a device 1 according to the present invention is slidably mounted.

Figure 13:
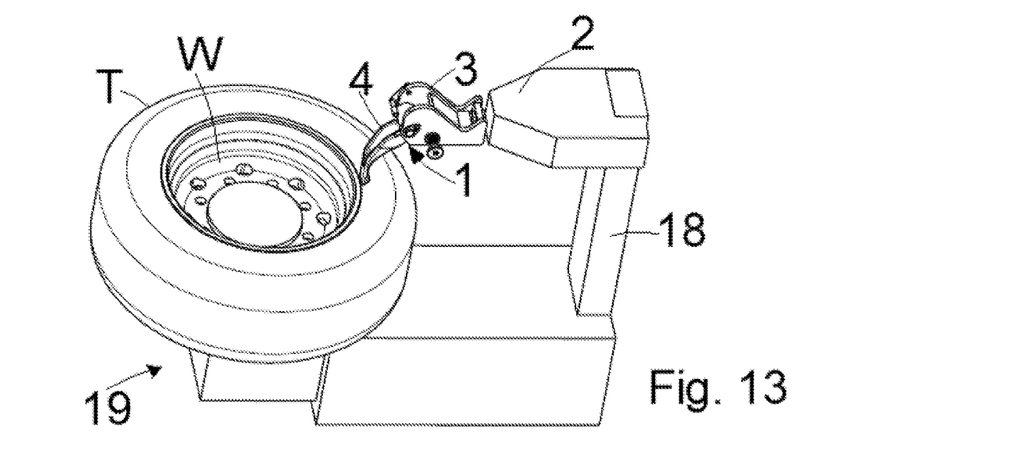
FIGS. 13, 14 and 15 are perspective slightly from above, side and top views, respectively, of another embodiment of disassembling machine according to the present invention.
Figure 14:
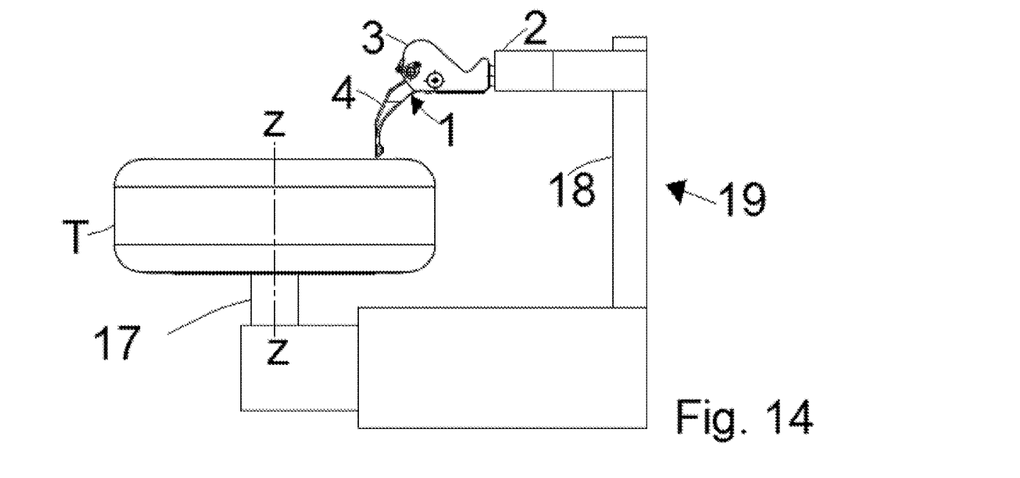
Figure 15:
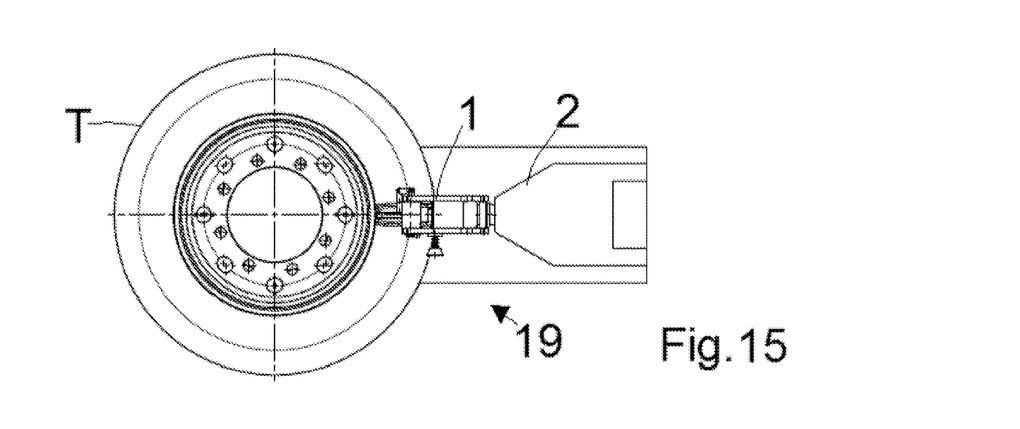

The embodiment shown in FIGS. 13 to 15, an assembling-disassembling machine 19 similar to that described above is shown where the support means and the rotational drive means 17 are designed to cause a tired wheel to rotate about a vertical axis z-z, whereas the guide member 18 allows movements in a substantially vertical direction.

Figures 16, 17, 18:
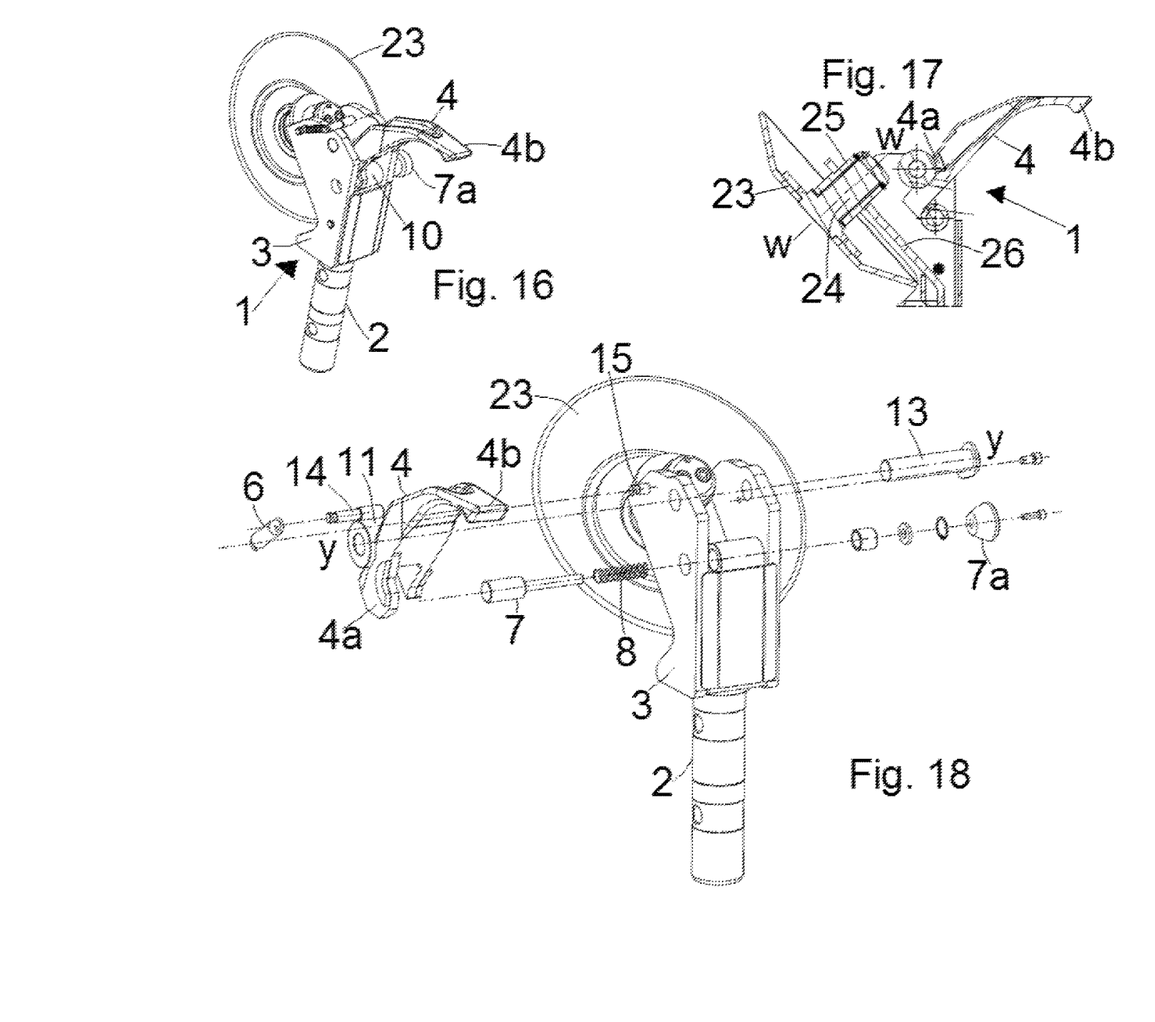
FIG. 16 is a perspective view of another embodiment of a disassembling tool according to the present invention.
FIG. 17 is a cross-section view of the device of FIG. 16.
FIG. 18 is an enlarged view in explosion of the device of FIGS. 16 and 17.

With reference to the embodiment shown in FIGS. 16 to 18, a disassembling device similar to that illustrated in FIGS. 1 to 3 is shown which is also provided with a bead breaking roller 23 that can be connected, preferably pivoted, to the arm 2. More particularly, the roller 23 can be provided with a central pin 24 inserted and locked in position for rotation in a sleeve 25 secured in a respective bore formed in a plate 26 bridge connecting the plates 3.

The axis of rotation w-w of the roller 23 is substantially orthogonal to the articulation axis y-y of the tool 4, and inclined with respect to the longitudinal axis x-x of the support arm 2.

With such a device, first one tire bead is bead broken by means of the roller 23, as it is common practice in the art, from its respective edge of the wheel rim, and then the arm 2 is set in rotation and the tool 4 is controlled as indicated above.

As it will be understood, unlike the devices and the machines described in the European patent applications EP-1 177 920 and EP-1 398 184 the above described device according to the present invention is not equipped with actuators for controlling articulations movements of the tool 4, and has in any case a much simpler and cheaper to produce.

With respect to the device disclosed in the European patent application EP-1 714 807, the above described device has, among the other things, locking means arranged to block the tool 4 in position once it has been brought in extraction position. This is particularly advantageous as the disassembling device 1 is suitable for firmly holding the position of the tire bead engaged and grasped by it throughout the whole extraction or dragging operation beyond the edge of its respective wheel rim.

As it will be noted, a disassembling device 1 is preferably pivoted to the arm 2, and thus it can be only angularly moved with respect to the arm 2, whereas in the case of the European patent application EP-1 714 807 the tool can effect roto-translational movements with respect to the support arm. The combination of rotation and translation with such prior art device is required to ensure a suitable relative movement between tool and components of the wheel during a disassembling operation.

In a device according to the present invention, instead, part of the translation movement required between tool 4 and components of the wheel can be obtained owing to the provision of locking means that, after the tool has been angularly displaced, block the tool 4 in position, and following the movement of the support arm 2 the tool 4 effects translation movements with respect to the wheel rim W.

The disassembling device, the disassembling machine, and the disassembling method described above are susceptible to numerous modifications and variations within the scope of protection of the following claims.

The invention claimed is:

1. A device for dismounting a tired wheel having a wheel rim and a tire mounted on the wheel rim, comprising:
   a support member,
   a bill or lever-shaped disassembling tool having one end thereof articulated to said support member, and the other work end thereof substantially hook-shaped, whereby said disassembling tool can be angularly displaced between a first insertion position between the tire bead of the tire and edge of the wheel rim and a second engagement and extraction position of the tire bead,
   comprising an interception element for holding said tool in an engagement and extraction position wherein the interception element is carried either by said support member or by said disassembling tool and arranged to intercept said tool or said support member, respectively, when said disassembling tool reaches said engagement and extraction position, said interception element comprising an elastically loaded pin, wherein during the angular displacement between said first insertion position and the second extraction position and upon reaching the second extraction position, the elastically loaded pin is energized to lock said tool in said second extraction position, and thereby preventing any backwards angular movement of said tool.

2. The device as claimed in claim 1, comprising returning means or articulation or pivoting means between said articulation end and said support member, designed to allow angular displacements of said disassembling tool with respect to said support member between said insertion position and said engagement and extraction position due to the reaction force of a wheel rim and/or the tire onto the work end.

3. The device as claimed in claim 2, wherein said returning means comprises an elastically loading component designed to cause the disassembling tool to return to its insertion position.

4. The device as claimed in claim 1, wherein, when said tool is in the first insertion position, said interception element in a retracted position in which it does not hinder the tool articulation, whereas, when the tool is moved into the second extraction position said interception element is triggered into a position in which it blocks any further articulation movement of said tool with respect to said support member.

5. The device as claimed in claim 1, wherein in said support member a hole or sleeve is provided in which said elastically loaded pin is slidably mounted.

6. The device as claimed in claim 1, comprising a pair of plates mounted at the end of said support member, said tool being pivoted or articulated to said plates.

7. The device as claimed in claim 1, comprising a bush element connected to a proximal end of said tool and delimiting an axial light alignable with respective holes formed in said support member, and in which an articulation pin can be inserted and locked.

8. The device as claimed in claim 1, further comprising a bead breaking roller connected to said support member.

9. The device as claimed in claim 8, wherein said roller has a central pin inserted and locked in position in a sleeve secured in a respective hole formed in a plate connected to said support member.

10. The device as claimed in claim 1, further comprising an assembling-disassembling machine comprising a base, support means and rotational drive means for a tired wheel mounted for rotation about a horizontal or vertical axis, and a guide member on which said support member is slidably mounted.

11. A method of disassembling a tire bead from its respective wheel rim edge, comprising the following steps in sequence:
 arranging a disassembling bill tool in an insertion position in which a work end thereof is abutting against said tire bead of a tired wheel to be disassembled,
 causing a relative movement between said disassembling tool and said wheel rim in a direction parallel to the axis of rotation of said tired wheel or of said wheel rim, thereby forcing the work end of said tool to enter between the tire and the wheel rim and to go beyond the tire bead,
 causing a relative movement along an orthogonal direction to said axis of rotation between wheel rim and tool, thereby causing an angular movement of said tool between said first insertion position and a second extraction position, where said work end is facing in the direction moving away from the axis of rotation and is forced grasping with said tire bead that is thus radially widened, thereby energizing an interception element to lock said tool in said second extraction position, and thereby preventing any backwards angular movement of said tool,
 moving backwards said disassembling tool and/or said wheel rim parallel to said axis of rotation, and causing said wheel or said tool to rotate, thereby bringing the whole tire bead beyond the edge of the wheel rim.

12. The method as claimed in claim 11, wherein during said relative movement the tool is moved from said insertion position to said extraction position owing to the reaction force applied onto the tool by the wheel rim.

13. The method as claimed in claim 11, wherein it is carried out through a disassembling device for dismounting a tired wheel having a wheel rim and a tire mounted on the wheel rim, the disassembling device for the method comprising:
 a support member,
 a bill or lever-shaped disassembling tool having one end thereof articulated to said support member, and the other work end thereof substantially hook-shaped, whereby said disassembling tool can be angularly displaced between a first insertion position between the tire bead of the tire and edge of the wheel rim and a second engagement and extraction position of the tire bead,
 comprising an interception element for holding said tool in an engagement and extraction position wherein the interception element is carried either by said support member or by said disassembling tool and arranged to intercept said tool or said support member, respectively, when said disassembling tool reaches said engagement and extraction position, said interception element comprising an elastically loaded pin.

14. The method as claimed in claim 13, wherein in said step in which a relative movement along a direction orthogonal to said axis of rotation is caused, the wheel rim and tool are relatively moved along a direction parallel to the longitudinal axis of said support member.

15. A device for dismounting a tired wheel having a wheel rim and a tire mounted on the wheel rim, comprising:
 a support member,
 a bill or lever-shaped disassembling tool having one end thereof articulated to said support member, and the other work end thereof substantially hook-shaped, whereby said dismounting tool can be angularly displaced between a first insertion position between the tire bead of the tire and edge of the wheel rim and a second engagement and extraction position of the tire bead,
 comprising an interception element for holding said tool in an engagement and extraction position wherein the interception element is carried either by said support member or by said disassembling tool and arranged to intercept said tool or said support member, respectively, when said disassembling tool reaches said engagement and extraction position, said interception element comprising an elastically loaded pin,
 comprising returning means or articulation or pivoting means between said articulation end and said support member, designed to allow angular displacements of said disassembling tool with respect to said support member between said insertion position and said engagement and extraction position due to the reaction force of a wheel rim and/or the tire onto the work end,
 wherein said returning means comprises an elastically loading component designed to cause the disassembling tool to return to its insertion position, and
 comprising a bush element connected to the proximal end of said tool and delimiting an axial light alignable with respective holes formed in said support member, and in which an articulation pin can be inserted and locked.

* * * * *